US010311356B2

(12) United States Patent
Gu et al.

(10) Patent No.: US 10,311,356 B2
(45) Date of Patent: Jun. 4, 2019

(54) UNSUPERVISED BEHAVIOR LEARNING SYSTEM AND METHOD FOR PREDICTING PERFORMANCE ANOMALIES IN DISTRIBUTED COMPUTING INFRASTRUCTURES

(71) Applicant: North Carolina State University, Raleigh, NC (US)

(72) Inventors: Xiaohui Gu, Raleigh, NC (US); Daniel Dean, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 880 days.

(21) Appl. No.: 14/480,270

(22) Filed: Sep. 8, 2014

(65) Prior Publication Data

US 2015/0074023 A1 Mar. 12, 2015

Related U.S. Application Data

(60) Provisional application No. 61/876,097, filed on Sep. 10, 2013, provisional application No. 61/875,439, filed on Sep. 9, 2013.

(51) Int. Cl.
*G06N 3/08* (2006.01)
(52) U.S. Cl.
CPC ..................... *G06N 3/08* (2013.01)
(58) Field of Classification Search
CPC ...... G06N 99/005; G06N 5/025; G06N 7/005; G06K 9/6256; G06K 9/6269
(Continued)

(56) References Cited

U.S. PATENT DOCUMENTS 7,730,364 B2 6/2010 Chang et al.
9,218,570 B2 * 12/2015 Biem .................... G06N 5/046
(Continued)

OTHER PUBLICATIONS

Dean et al.—"UBL: unsupervised behavior learning for predicting performance anomalies in virtualized cloud systems"—2012—https://dl.acm.org/citation.cfm?id=2371572 (Year: 2012).*
(Continued)

*Primary Examiner* — Scott A. Waldron
*Assistant Examiner* — Viker A Lamardo
(74) *Attorney, Agent, or Firm* — Michael Best & Friedrich LLP

(57) ABSTRACT

An unsupervised behavior learning system and method for predicting anomalies in a distributed computing infrastructure. The distributed computing infrastructure includes a plurality of computer machines. The system includes a first computer machine and a second computer machine. The second computer machine is configured to generate a model of normal and anomalous behavior of the first computer machine, where the model is based on unlabeled training data. The second computer machine is also configured to acquire real-time data of system level metrics of the first machine; determine whether the real-time data is normal or anomalous based on a comparison of the real-time data to the model; and predict a future failure of the first computer machine based on multiple consecutive comparisons of the real-time data to the model. Upon predicting a future failure of the first computer machine, generate a ranked set of system-level metrics which are contributors to the predicted failure of the first computer machine, and generate an alarm that includes the ranked set of system-level metrics. The model of normal and anomalous behavior may include a self-organizing map.

22 Claims, 10 Drawing Sheets

(58) Field of Classification Search
USPC .......................................................... 706/12
See application file for complete search history.

(56) References Cited

U.S. PATENT DOCUMENTS

| | | | | |
|---|---|---|---|---|
| 2006/0208870 | A1* | 9/2006 | Dousson | G05B 23/027 340/506 |
| 2007/0289013 | A1* | 12/2007 | Lim | G06F 21/552 726/22 |
| 2011/0175750 | A1* | 7/2011 | Anderson | G01D 4/004 340/870.16 |
| 2012/0240185 | A1* | 9/2012 | Kapoor | H04L 63/1425 726/1 |
| 2014/0082417 | A1* | 3/2014 | Barton | G06F 11/079 714/26 |

OTHER PUBLICATIONS

Milano et al.—"Self-Organizing Nets for Optimization"—2002—ftp://ftp.idsia.ch/pub/juergen/ieeefluid2004.pdf (Year: 2002).*

Gu et al.—"Adaptive System Anomaly Prediction for Large-Scale Hosting Infrastructures"—2010—http://dance.csc.ncsu.edu/papers/podc10.pdf (Year: 2010).*

"Stopping cloud computer problems before they start"—2012—https://web.archive.org/web/20121023150151/https://www.sciencedaily.com/releases/2012/09/120910112527.htm (Year: 2012).*

\* cited by examiner

_US 10,311,356 B2_

UNSUPERVISED BEHAVIOR LEARNING SYSTEM AND METHOD FOR PREDICTING PERFORMANCE ANOMALIES IN DISTRIBUTED COMPUTING INFRASTRUCTURES

RELATED APPLICATIONS

This patent application claims priority from U.S. Provisional Application No. 61/875,439 filed Sep. 9, 2013, entitled, "UNSUPERVISED BEHAVIOR LEARNING SYSTEM AND METHOD FOR PREDICTING PERFORMANCE ANOMALIES IN DISTRIBUTED COMPUTING INFRASTRUCTURES," and U.S. Provisional Application No. 61/876,097 filed Sep. 10, 2013, entitled, "UNSUPERVISED BEHAVIOR LEARNING SYSTEM AND METHOD FOR PREDICTING PERFORMANCE ANOMALIES IN DISTRIBUTED COMPUTING INFRASTRUCTURES," the disclosures of which are incorporated herein, in their entirety, by reference.

STATEMENT OF GOVERNMENT INTEREST

This invention was made with government support under Contract No. 550816, awarded by the U.S. National Science Foundation, and Contract No. 552318, awarded by the U.S. Army Research Office. The government has certain rights in the invention.

BACKGROUND

The present invention relates to unsupervised behavior learning and anomaly prediction in a distributed computing infrastructure. In one particular example, the invention is implemented in an Infrastructure-as-a-Service ("IaaS") cloud system.

IaaS cloud systems allow users to lease computing resources in a pay-as-you-go fashion. In general, a cloud system includes a large number of computers that are connected through a real-time communication network (e.g., the Internet, Local Area Network, etc.) and can run numerous physical machines ("PMs") or virtual machines ("VMs") simultaneously. A VM is a software-based implementation of a computer that emulates the computer architecture and functions of a real world computer. Due to their inherent complexity and sharing nature, cloud systems are prone to performance anomalies due to various reasons such as resource contentions, software bugs, and hardware failures. It is difficult for system administrators to manually keep track of the execution status of tens of thousands of PM or VMs. Moreover, delayed anomaly detection can cause long service delays, which is often associated with a large financial penalty.

Predicting and detecting anomalies, faults, and failures is of interest to the computing community as the unpredicted or surprise failure of a computing system can have numerous negative impacts. Broadly, contemplated approaches of failure prediction can include supervised learning methods and unsupervised learning methods. Supervised learning methods rely on labeled training data to accurately identify previously known anomalies. Unsupervised learning methods do not require labeled training to identify anomalies. These methods can be further divided into anomaly detection schemes and anomaly prediction schemes. Anomaly detection schemes identify a failure at the moment of failure, while anomaly prediction schemes try to predict a failure before it occurs.

SUMMARY

Some embodiments of the invention provide an unsupervised behavior learning ("UBL") system for predicting anomalies in a distributed computing infrastructure, which in one embodiment is a virtualized cloud computing system that runs application VMs. The system uses an unsupervised learning method or technique called Self Organizing Map ("SOM") to capture the patterns of normal operation of all the application VMs. The unsupervised learning method does not require labeled training data. To predict anomalies, the system looks for early deviations from normal system behaviors. Upon predicting an anomaly, the system can provide a warning that specifies the metrics that are the top contributors to the anomaly.

Other embodiments of the invention provide a method of predicting performance anomalies in a distributed computing infrastructure, which in one embodiment is a virtualized cloud system, with unsupervised behavior learning. The method begins with a behavior learning phase. In the behavior learning phase, the method develops a model of normal and anomalous behavior of the system with a SOM training process that does not require labeled training data. Next, the method proceeds into a performance anomaly prediction phase. In the performance anomaly prediction phase, the method receives and compares real-time data with the SOM to determine if the system's current behavior is normal or anomalous. The method predicts a future system failure when numerous consecutive samples of real-time data indicate anomalous system behavior. Upon predicting a system failure, the method proceeds into performance anomaly cause inference phase. In the performance anomaly cause inference phase, the method identifies a ranked set of system-level metrics which are the top contributors to the predicted system failure. The method raises an alarm that includes the ranked set of system-level metrics.

In addition, certain embodiments of the invention provide a method of predicting performance anomalies in a first computer machine in a distributed computing infrastructure with a second computer machine using unsupervised behavior learning. The method includes generating, by the second computer machine, a model of normal and anomalous behavior for the first computer machine based on unlabeled training data; acquiring, by the second computer machine, real-time data of system level metrics for the first computer machine; and determining, by the second computer machine, whether the real-time data is normal or anomalous based on a comparison of the real-time data to the model. The method also includes predicting, by the second computer machine, a future system failure of the first computer machine based on multiple consecutive comparisons of the real-time data to the model. Upon predicting a future system failure, the second computer machine generates a ranked set of system-level metrics which are contributors to the predicted system failure of the first computer machine, and generates an alarm that includes the ranked set of system-level metrics.

The act of generating a model of normal and anomalous behavior may include generating a self-organizing map.

In still another embodiment or aspect, the invention provides an unsupervised behavior learning system for predicting anomalies in a distributed computing infrastructure. The distributed computing infrastructure includes a plurality of computer machines. The system includes a first computer machine and a second computer machine. The second computer machine is configured to generate a model of normal and anomalous behavior of the first computer machine, where the model is based on unlabeled training data. The second computer machine is also configured to acquire real-time data of system level metrics of the first machine; determine whether the real-time data is normal or anomalous based on a comparison of the real-time data to the model; and predict a future failure of the first computer machine based on multiple consecutive comparisons of the real-time data to the model. Upon predicting a future failure of the first computer machine, generate a ranked set of system-level metrics which are contributors to the predicted failure of the first computer machine, and generate an alarm that includes the ranked set of system-level metrics. The model of normal and anomalous behavior may include a self-organizing map.

Other aspects of the invention will become apparent by consideration of the detailed description and accompanying drawings.

DETAILED DESCRIPTION

Before any embodiments and aspects of the invention are explained in detail, it is to be understood that the invention is not limited in its application to the examples provided, the embodiments discussed, or to the details of construction and the arrangement of components set forth in the following description or illustrated in the following drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. A plurality of hardware and software based devices, as well as a plurality of different structural components may be utilized to implement the invention.

Figure 1:
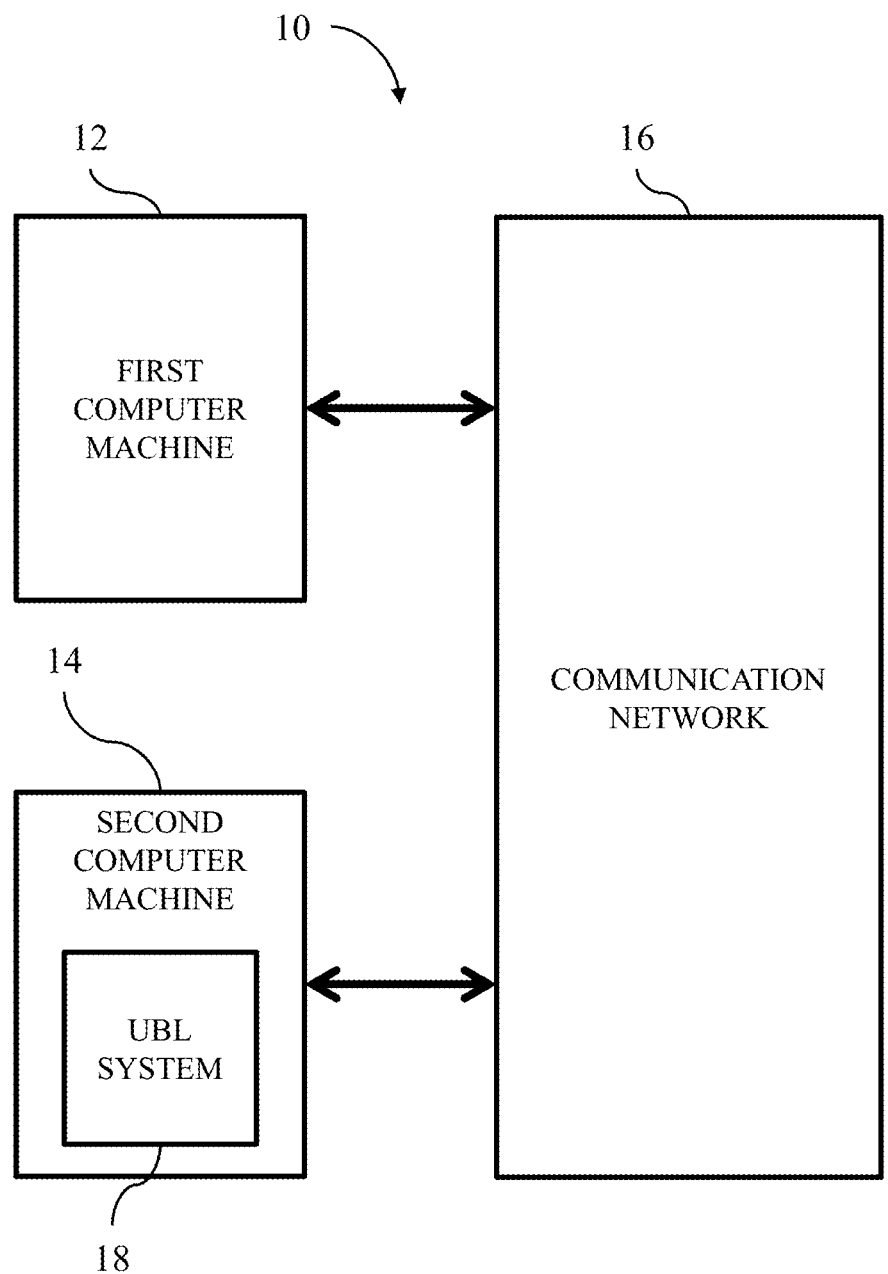
FIG. 1 illustrates a distributed computing infrastructure.

A distributed computing infrastructure includes a large number of computers that are connected through one or more communications networks, such as a real-time communications networks. FIG. 1 illustrates an exemplary distributed computing infrastructure 10 that includes, among other components, a first computer machine 12, a second computer machine 14, and a communication network 16. A computer machine is either a physical machine (e.g., a computer) or a virtual machine that runs on one or more computers. Each computer includes a processor (such as a CPU or a microprocessor), memory (RAM, ROM, etc.), and I/O elements, and one or more peripherals (e.g., display, keyboard, mouse, etc.). The second computer machine 16 includes, among other components, an unsupervised behavior learning ("UBL") system 18.

In some implementations, the UBL system 18 is a virtual module that runs on a distributed computing infrastructure such as the Xen platform. The UBL system 18 is scalable and can induce behavior models for a large number of application components on-the-fly without imposing excessive learning overhead. Production distributed infrastructures typically have less than 100% resource utilization. The UBL system 18 utilizes these residual resources to perform behavior learning as background tasks that are co-located with different application VMs (e.g., foreground tasks) on distributed hosts.

Figure 2:
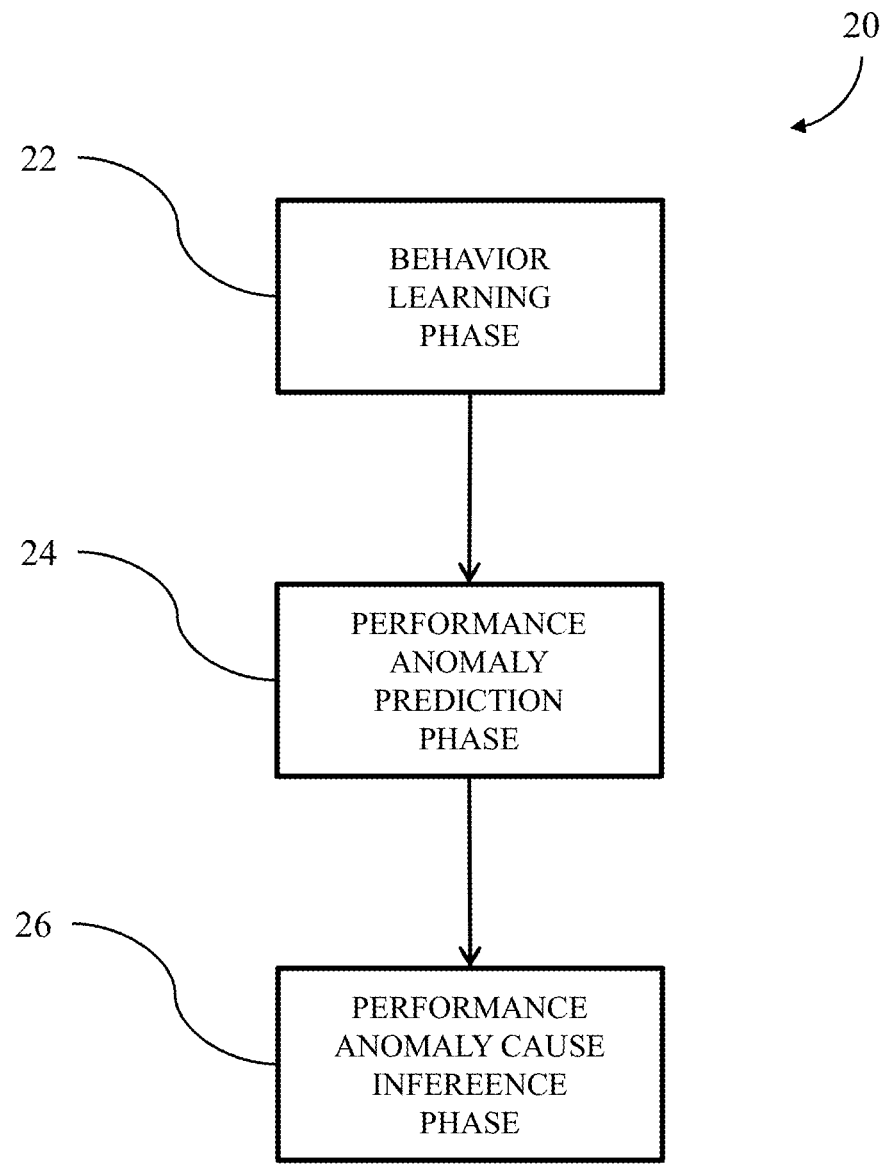
FIG. 2 illustrates a process for operating the UBL system in FIG. 1 to predict performance anomalies.

FIG. 2 illustrates an exemplary process 20 of operating the UBL system 18 to predict performance anomalies in the first computer device 12. The steps of the process 20 are described in an iterative manner for descriptive purposes. Various steps described herein with respect to the process 20 are capable of being executed simultaneously, in parallel, or in an order that differs from the illustrated serial and iterative manner of execution. The process 20 includes, among other steps, a behavior learning phase (step 22), a performance anomaly prediction phase (step 24), and a performance anomaly cause inference phase (step 26).

In the behavior learning phase (step 22), the UBL system 18 determines a model that represents normal system behavior of a VM (e.g., the first computer machine 12). In some implementations, the model is a SOM. The SOM maps a high dimensional input space into a low dimensional map space while preserving the topological properties of the original input space (i.e., two similar samples will be projected to close positions in the map). The UBL system 18 can dynamically induce a SOM for each VM of the virtualized distributed computing infrastructure 10 to capture the different VM behaviors. The SOM is composed of a set of nodes. The nodes are referred to as "neurons." The neurons are arranged in a lattice formation. In some implementations, the neurons are arranged in a gird formation. Each neuron is associated with a weight vector W(t) and a coordinate in the SOM. The SOM is developed based on a plurality of measurement vectors $D(t)=[x_1, x_2, \ldots, x_n]$ included in a set of unlabeled training data, where $x_i$ denotes one system-level metric (e.g., CPU, memory, disk I/O, or network traffic) of a VM at time instance t. The weight vectors are the same length as the measurement vectors (i.e., D(t)).

Figure 3:
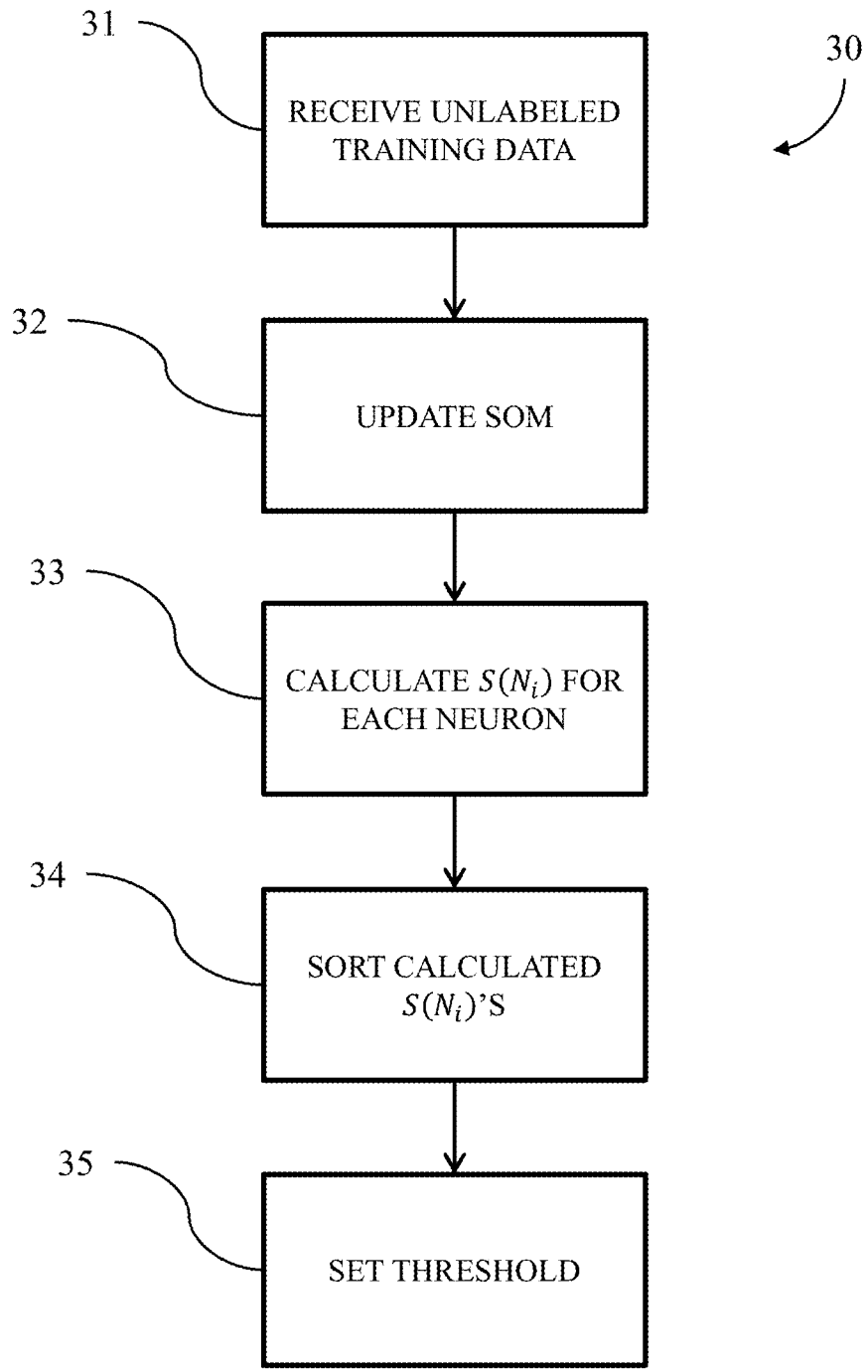
FIG. 3 illustrates a process for operating the UBL system in FIG. 1 to perform behavior learning.

FIG. 3 illustrates an exemplary process 30 for operating the UBL system 18 to perform the behavior learning phase 22. The UBL system 18 receives a set of unlabeled training data (step 31). The set of unlabeled training data includes a plurality of measurements vectors. The UBL system 18 updates the SOM for each measurement vector in the plurality of measurement vectors (step 32). Next, the UBL system 18 calculates a neighborhood area size for each neuron in the SOM (step 33). The UBL system 18 calculates a neuron's neighborhood area size by examining each neuron's immediate neighbors. In the two-dimensional lattice topography, immediate neighbors include the top, left, right, and bottom neighbors. In some implementations, the UBL system 18 calculates the Manhattan distance between the neuron and its neighbor. The Manhattan distance between two neurons $N_i$, $N_j$ with weight vectors $W_i=[w_{1,i}, \ldots, w_{k,i}]$, $W_j=[w_{1,j}, \ldots, w_{k,j}]$ respectfully, is:

$$M(N_i, N_j) = \sum_{l=1}^{k} |w_{l,i} - w_{l,j}|$$

The neighborhood area size for neuron is the sum of the Manhattan distance between the neuron $N_i$ and its top, left, right, and bottom immediate neighbors denoted by $N_T$, $N_L$, $N_R$, and $N_B$:

$$S(N_i) = \sum_{X \in \{N_T, N_L, N_R, N_B\}} M(N_i, X)$$

Next, the UBL system 18 sorts all of the calculated neighborhood area size values (step 34) and sets a threshold value to be the neighbor area size value at a predetermined percentile (step 35). In some implementations, the predetermined percentile value is 85%. Other percentile values are used in different implementations.

Figure 4:
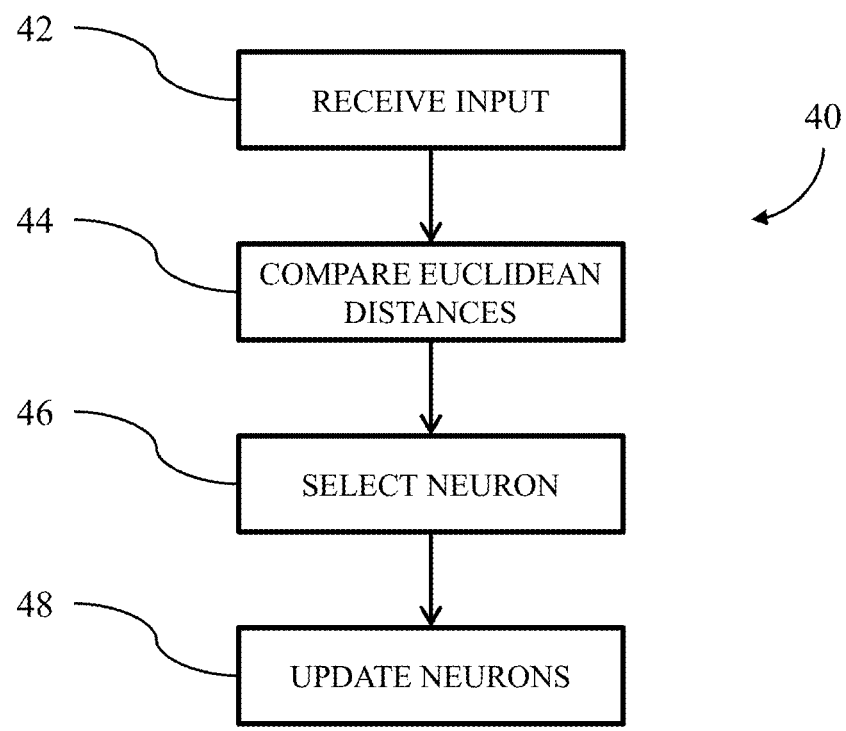
FIG. 4 illustrates a process for operating the UBL system in FIG. 1 to update a SOM.

FIG. 4 illustrates an exemplary process 40 for operating the UBL system 18 to update the SOM based on a measurement vector from a set of unlabeled training data. The UBL system 18 receives an input measurement vector from the set of unlabeled training data (step 42). The UBL system 18 compares a Euclidean distance of the input measurement vector to each different neuron's weight vector in the SOM (step 44). Next, the UBL system 18 selects the neuron with the smallest Euclidean distance as the currently trained neuron (step 46). Then, the UBL system 18 updates the weight vectors of the currently trained neuron and the neurons that are in the neighborhood of the currently trained neuron (step 48). In some implementations, any neuron that is in a radius of r units from the currently trained neuron is considered to be inside the neighborhood. An exemplary formula, used by the method, for updating the weight vector of any neuron at time t is:

$$W(t+1) = W(t) + N(v,t) \cdot L(t) \cdot (D(t) - W(t))$$

$N(v,t)$ is a neighborhood function (e.g., a Gaussian function) which depends on the lattice distance to a neighbor neuron v. $L(t)$ is a learning coefficient that can be applied to modify how much each weight vector is changed in different iterations of the behavior learning phase.

Figure 5:
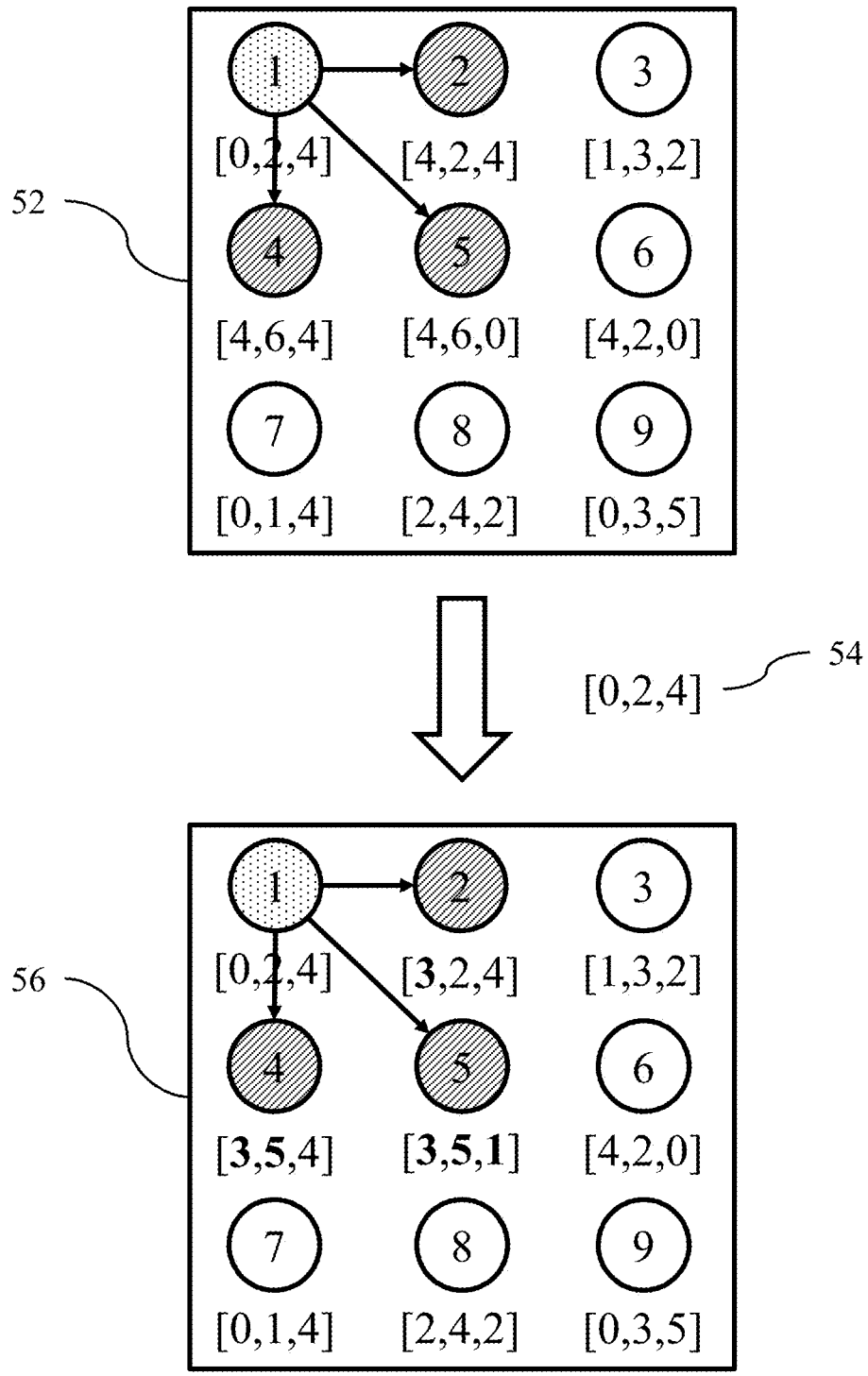
FIG. 5 illustrates an exemplary iteration of the process in FIG. 4.

FIG. 5 illustrates an exemplary iteration of process 40. In this exemplary iteration, the SOM includes 9 neurons. The weight vectors for each neuron in SOM 52 represent the values before the SOM is updated with an input measurement vector 54. In this exemplary iteration, the input measurement vector 54 is [0, 2, 4]. The weight vectors in SOM 56 represent the values after the SOM is updated with the input measurement vector 54. The UBL system 18 selects neuron 1 as the currently trained neuron because it has the smallest Euclidean distance to the input measurement vector 54. The UBL system 18 updates the weight vector of neuron 1. In this exemplary iteration: r=1, L=1, and N=1/4. Accordingly, the UBL system 18 updates the weight vectors of neurons 2, 4, and 5 as they are in the neighborhood of neuron 1. The neighborhood function used in this exemplary iteration is simple and only intended to help illustrate the process. It is to be understood that more complex neighborhood functions are used in other implementations of the invention.

Figure 6:
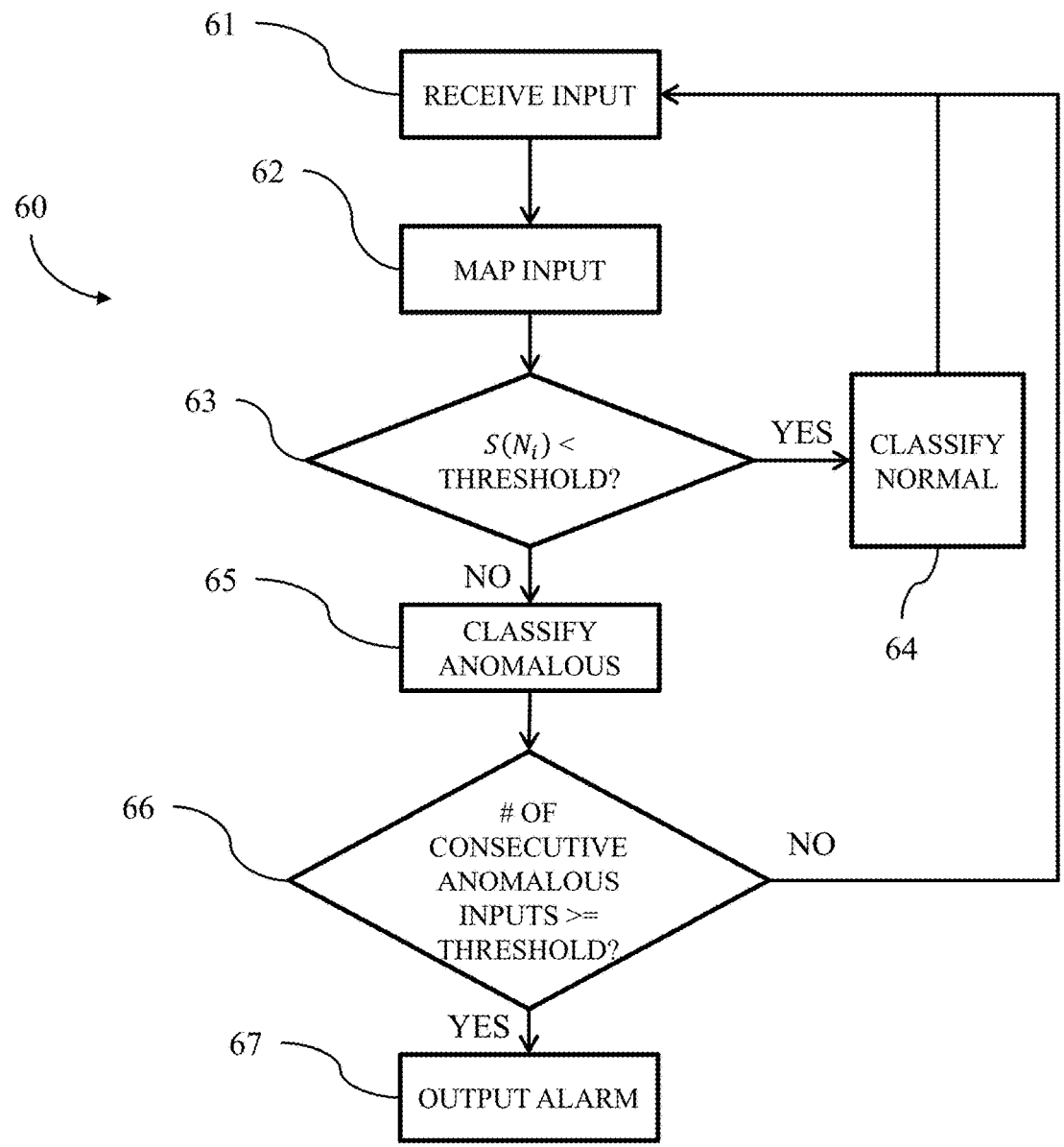
FIG. 6 illustrates a process for operating the UBL system in FIG. 1 to perform performance anomaly prediction.

FIG. 6 illustrates an exemplary process 60 for operating the UBL system 18 to perform the performance anomaly prediction phase 24. The UBL system 18 receives a real-time input measurement vector (step 61). The UBL system 18 maps the real-time input measurement vector to a neuron in the SOM (step 62). In some implementations, the UBL system 18 performs mapping with the same Euclidean distance metric used in the behavior learning phase 22. Next, the UBL system 18 compares the neighborhood area size value (i.e., $S(N_i)$) of the neuron that the real-time input measurement vector is mapped to with the set threshold (step 63). The UBL system 18 classifies the real-time input measurement vector as normal, if it is mapped to a neuron with a neighborhood area size value that is below the threshold (step 64). On the other hand, the UBL system 18 classifies a real-time input measurement vector as anomalous, if it is mapped to a neuron with a neighborhood area size that is greater than or equal to the threshold (step 65). The UBL system 18 determines if a threshold number of consecutive anomalous real-time input measurement vectors have occurred (step 66). If a threshold number of consecutive anomalous real-time measurement vectors have occurred, the UBL system 18 outputs an alarm (step 67). In some implementations, the UBL system 18 output the alarm if three consecutive anomalous real-time measurement vectors have occurred. In other implementations, the UBL system 18 uses a threshold number other than three.

Figure 7:
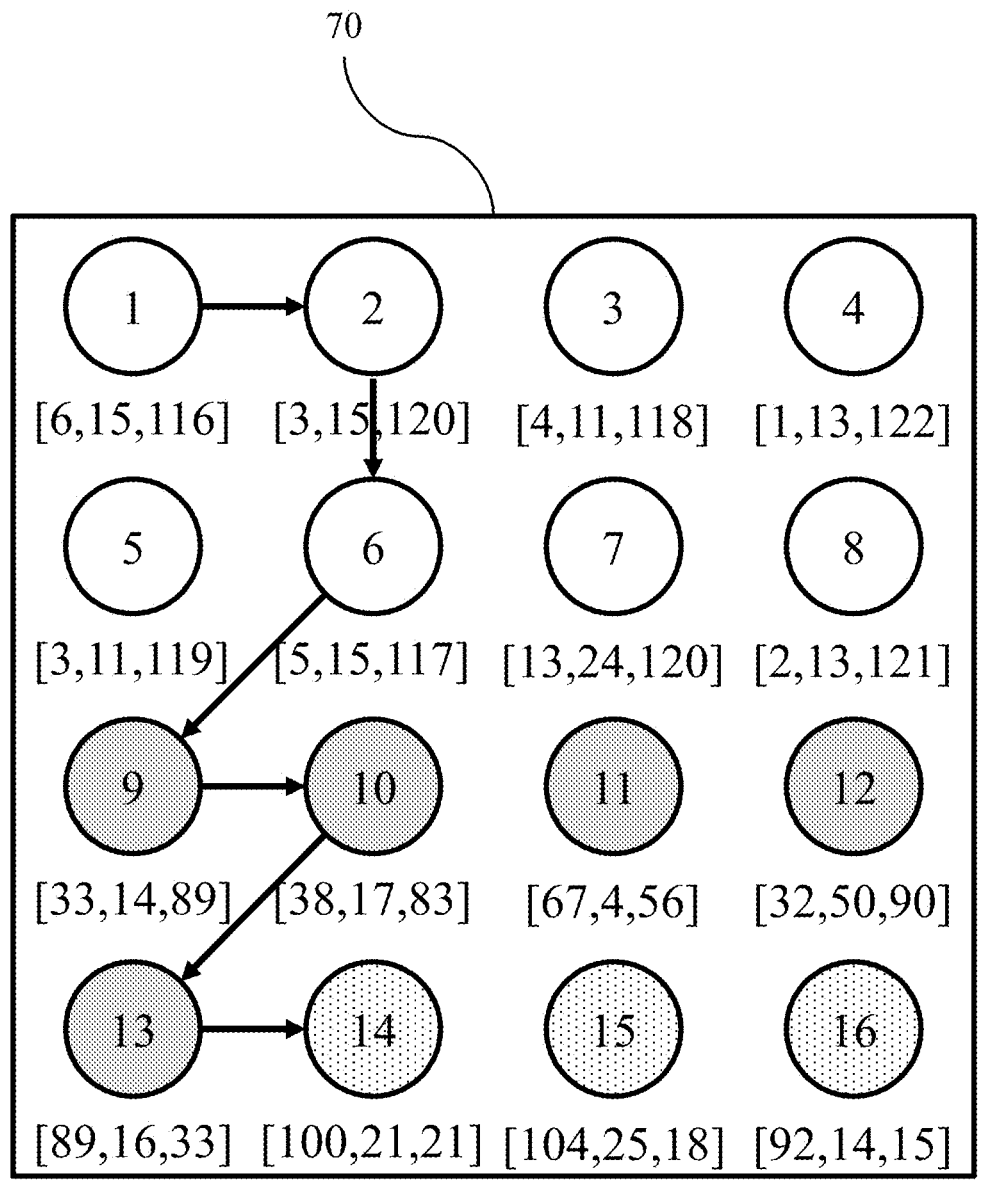
FIG. 7 illustrates an exemplary system failure of the UBL system in FIG. 1.

Performance anomalies, such as long service level objective ("SLO") time violations, in distributed infrastructures often manifest as anomalous changes in system-level metrics. Faults do not always cause an instantaneous SLO failure. Instead there is a time window from when the faults occur to the actual time of failure. Therefore, at any given time, the first computer machine 12 can be thought to be operating in one of three states: normal, pre-failure, and failure. FIG. 7 illustrates an exemplary system failure where the UBL system 18 follows a path through SOM 70 over time. The first computer machine 12 typically enters the pre-failure state before entering the failure state. Neurons 1-8 in SOM 70 represent normal state neurons. Neurons 9-13 in SOM 70 represent pre-failure state neurons. Neurons 14-16 in SOM 70 represent failure state neurons. The arrows in SOM 70 represent the evolving path of the UBL system 18.

Figure 8:
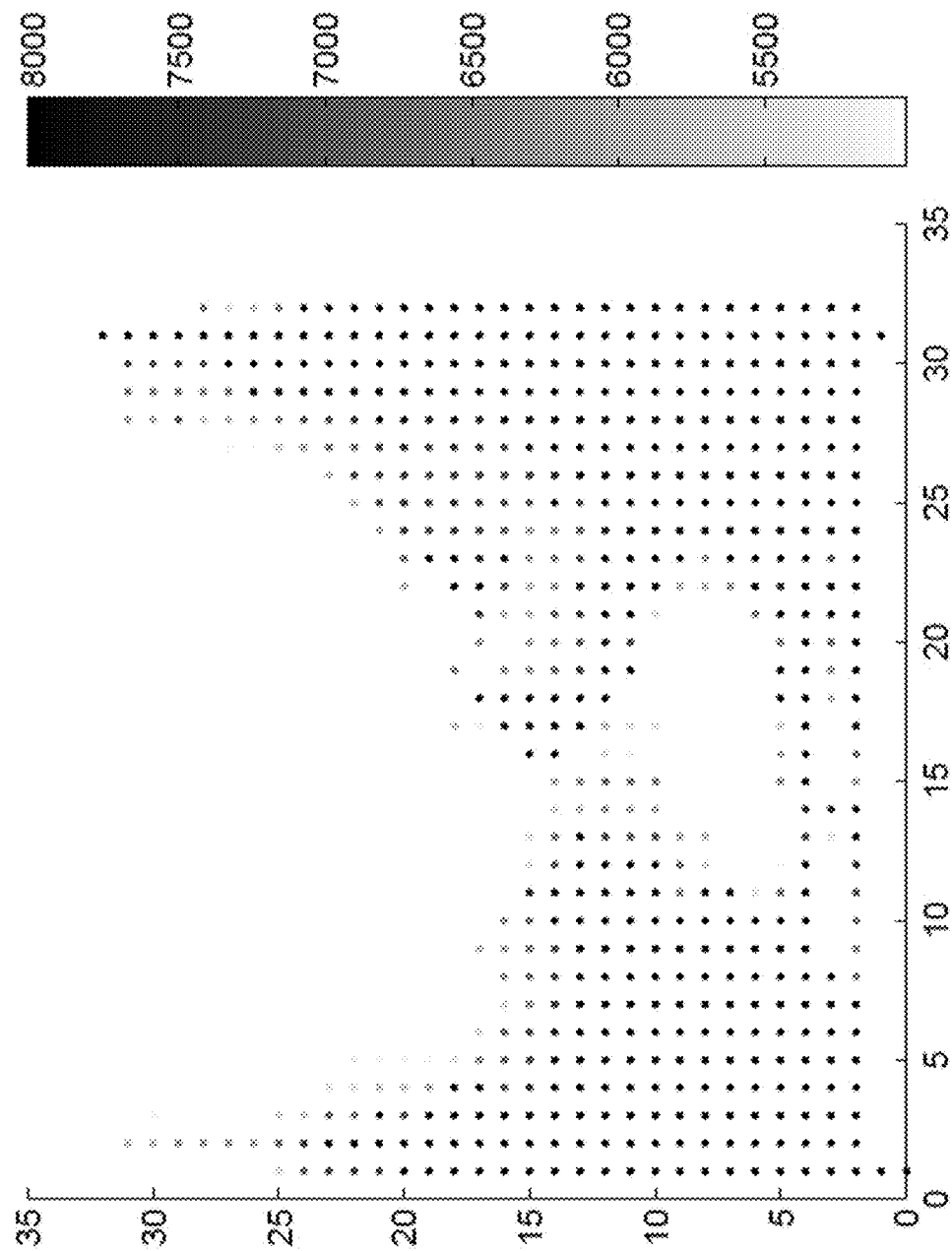
FIG. 8 illustrates an exemplary SOM model after the behavior learning phase.
Figure 9:
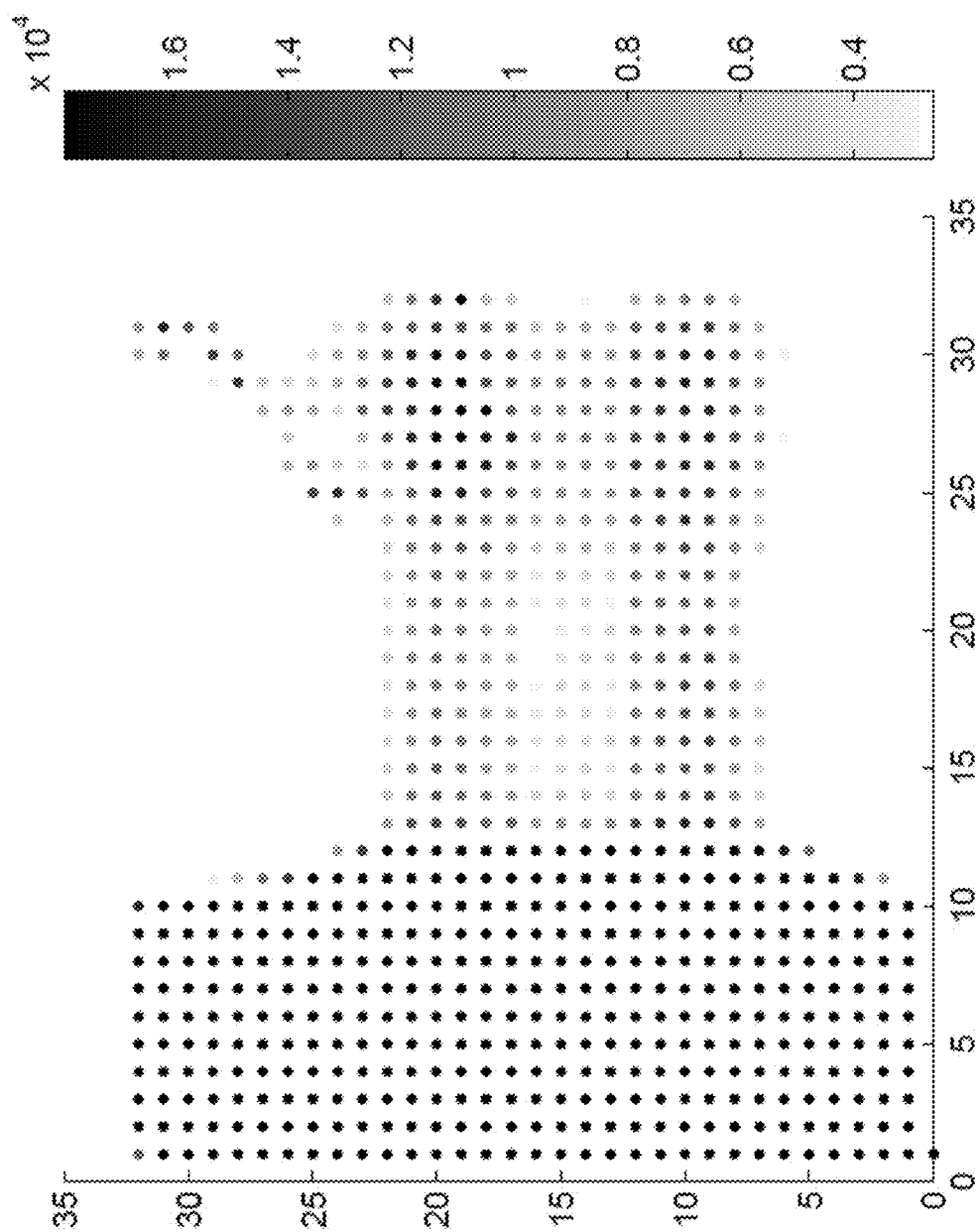
FIG. 9 illustrates an exemplary SOM model after the behavior learning phase.

FIGS. 8 and 9 illustrate two example SOM models after the behavior learning phase. FIG. 8 illustrates a SOM model for a RUBiS web server with a network hog bug. RUBiS is an online auction benchmark. FIG. 9 illustrates a SOM model for an IBM System S with a memory leak bug. IBM System S is a commercial stream processing system. In FIGS. 8 and 9, the X axis and Y axis represent the coordinates of the neurons and the gray-scale visualization identifies behavior patterns. Darker neurons represent anomalous behavior while lighter neurons represent normal behaviors.

Figure 10:
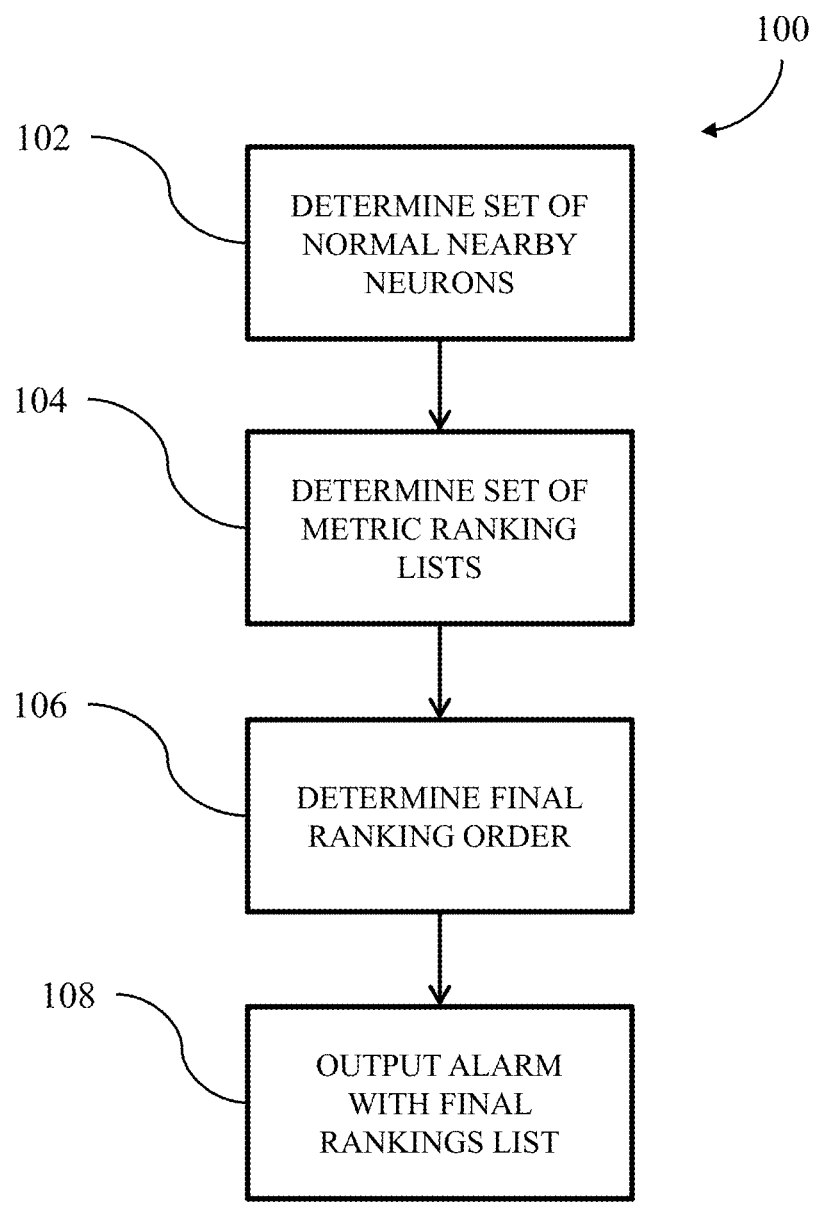
FIG. 10 illustrates a process for operating the UBL system in FIG. 1 to perform anomaly cause inference.

Upon deciding to raise an alarm, the UBL system 18 enters the performance anomaly cause inference phase 26. In this phase, the UBL system 18 determines and outputs the system-level metrics that differ the most as faulty metrics. FIG. 10 illustrates an exemplary process 100 for operating the UBL system 18 to perform the performance anomaly cause inference phase 26. The UBL system 18 determines a set of normal neurons that are nearby to the anomalous neuron which the last real-time input measurement vector was mapped to (step 102). In some implementations, if a neighbor neuron has a neighborhood area value that is above the threshold, the UBL system 18 ignores it and moves on to the next neuron in the neighborhood. If no normal neuron is found in the anomalous neuron's neighborhood, the UBL system 18 expands the distance calculation to include more neurons in the SOM.

Next, the UBL system 18 determines a set of metric ranking lists (step 104) by calculating the differences between the individual metric values of each normal neuron in the set and the individual metric values of the anomalous neuron. For each metric ranking list in the set, the UBL system 18 determines the absolute value of the calculated difference and sorts the metric differences from the highest to the lowest in order to determine a ranking order.

Then, the UBL system 18 determines a final ranking order for each of the rankings (step 106). In some implementations, the final ranking order is determined using majority voting. The UBL system 18 ascertains a first ranked metric by comparing the top ranked metric from each ranking list. The metric that is in the most ranking lists as the top ranked metric is set as the first ranked metric. The UBL system 18 repeats the above process to determine the final ranking of all of the other metrics. In the case of a tie, the UBL system 18 selects the metric that happens to be placed first in the final ranking list construction.

After determining a final ranking list for the metrics of the anomalous neuron, the UBL system 18 raises an alarm that contains the final ranking list of metrics (step 108).

In some implementations, the UBL system 18 performs retraining in the performance anomaly prediction phase 26. In some implementations, retraining includes updating the weight vectors of the SOM with real-time input measurement vectors, similar to processes used in the behavior learning phase 22. In some implementations, retraining also includes recalculating the neighborhood area size for each neuron in the SOM using the updated weight vectors. In some implementations, retraining occurs for each real-time input measurement vector after it has been mapped to a neuron and identified as normal or anomalous. In some implementations, retraining occurs for a plurality of real-time input measurement vectors after the plurality of real-time input measurement vectors have all been mapped to a neuron and identified as normal or anomalous. In some implementations, retraining occurs if a plurality of system failures occur and the method did not predict them. In some implementations, retraining occurs if the method predicts a large number of anomalies within a predetermined time frame.

If is to be understood that the unsupervised behavior learning, performance anomaly prediction, and performance anomaly cause inference methods described above can also be implemented on a distributed computing infrastructure that runs application PMs.

Thus, the invention provides, among other things, mechanisms for assessing the performance of a computing system. Various features and advantages of the invention are set forth in the following claims.

The invention claimed is:

1. A method of predicting performance anomalies in distributed computing infrastructure with a computer machine using unsupervised multi-dimensional behavior learning, the method comprising:
   aggregating and normalizing, with the computer machine, real-time data of a plurality of metrics for the distributed computing infrastructure;
   generating, with the computer machine, an artificial neural network model of normal and anomalous behavior for the distributed computing infrastructure based on unlabeled training data from a plurality of nodes associated with the distributed computing infrastructure, wherein the model includes a plurality of neurons;
   determining, with the computer machine, which neuron of the plurality of neurons an input real-time data should be mapped to and whether the input real-time data is normal or abnormal based on whether the mapped neuron represents a normal or abnormal system state;
   predicting, with the computer machine, a future system failure of the distributed computing infrastructure based on an evolution path in the artificial neural network model consisting of multiple consecutive comparisons of the real-time data to the artificial neural network model;
   upon predicting the future system failure, the computer machine generating a ranked list of metrics which are top contributors to the predicted future system failure of the distributed computing infrastructure, wherein the ranked list is generated based on differences between normal metric values and anomalous metric values
   selecting at least one preventative action based on the ranked list of metrics; and
   initiating the at least one preventative action.

2. The method of claim 1, wherein generating the artificial neural network model of normal and anomalous behavior includes generating a self-organizing map ("SOM").

3. The method of claim 2, wherein generating the SOM includes calculating a neighborhood area size for a first neuron in the SOM.

4. The method of claim 3, wherein calculating the neighborhood area size for a neuron in the SOM includes calculating a distance between the first neuron and a second neuron in the SOM.

5. The method of claim 3, wherein generating the SOM further includes setting a threshold value based at least in part on the neighborhood area size.

6. The method of claim 2, wherein determining whether the real-time data is normal or anomalous includes
   receiving a real-time input measurement vector,
   mapping the real-time input measurement vector to the neuron with the smallest distance with the input measurement vector in the SOM,
   comparing the neighborhood area size value of the mapped neuron to a threshold value,
   classifying the real-time input measurement vector as normal if the neighborhood area size value of the mapped neuron is less than the threshold value, and
   classifying the real-time input measurement vector as anomalous if the neighborhood area size value of the mapped neuron is greater than or equal to the threshold value.

7. The method of claim 2, wherein predicting the future system failure of the distributed computing infrastructure includes determining if a number of consecutive real-time input measurement vectors are mapped to anomalous neurons.

8. The method of claim 2, wherein generating the ranked list of metrics includes determining a set of normal neurons that are nearby to an anomalous neuron which a last real-time input measurement vector was mapped to.

9. The method of claim 1, wherein generating the artificial neural network model of normal and anomalous behavior includes updating a self-organizing map ("SOM").

10. The method of claim 9, wherein updating the SOM includes
    receiving an input measurement vector,
    calculating a distance of the input measurement vector to a weight vector of each neuron in the SOM,
    selecting a neuron in the SOM with the smallest distance to the input measurement vector, updating the weight vector of the selected neuron, and
updating weight vectors of neurons in a neighborhood of the selected neuron.

11. The method of claim 1, wherein the at least one preventative action includes at least one selected from a group consisting of rebooting a virtual machine, restarting a virtual machine, migrating a virtual machine to another host, cloning a virtual machine, scaling a resource of a virtual machine, and disk cleanup.

12. An unsupervised behavior learning system for predicting anomalies in a distributed computing infrastructure, the distributed computing infrastructure including a plurality of computer machines, the system comprising:
a computer machine configured to
aggregate and normalize real-time data of a plurality of metrics for the distributed computing infrastructure from a plurality of nodes associated with the distributed computing infrastructure;
generate an artificial neural network model of normal and anomalous behavior for the distributed computing infrastructure based on unlabeled training data, wherein the model includes a plurality of neurons;
determine which neuron of the plurality of neurons an input real-time data should be mapped to and whether the input real-time data is normal or abnormal based on whether the mapped neuron represents a normal or abnormal system state;
predict a future system failure of the distributed computing infrastructure based on an evolution path in the artificial neural network model consisting of multiple consecutive comparisons of the real-time data to the artificial neural network model;
upon predicting the future system failure of distributed computing infrastructure, generate a ranked list of metrics which are top contributors to the predicted future system failure of the distributed computing infrastructure, wherein the ranked list is generated based on differences between normal metric values and anomalous metric values
select at least one preventive action based on the ranked list of metrics; and
initiate the at least one preventative action.

13. The system of claim 12, wherein the artificial neural network model of normal and anomalous behavior includes a self-organizing map ("SOM").

14. The system of claim 13, wherein the computer machine generates the SOM includes calculating a neighborhood area size for a first neuron in the SOM.

15. The system of claim 14, wherein calculating the neighborhood area size for a neuron includes calculating a distance between the first neuron and a second neuron in the SOM.

16. The system of claim 14, wherein the computer machine generates the SOM further includes by setting a threshold value based at least in part on the neighborhood area size.

17. The system of claim 13, wherein the computer machine determines whether the real-time data is normal or anomalous includes
receiving a real-time input measurement vector,
mapping the real-time input measurement vector to a first neuron in the SOM,
comparing a neighborhood area size value of the first neuron to a threshold value,
classifying the real-time input measurement vector as normal if the neighborhood area size value of the first neuron is less than the threshold value, and
classifying the real-time input measurement vector as anomalous if the neighborhood area size value of the first neuron is greater than or equal to the threshold value.

18. The system of claim 13, wherein the computer machine predicts the future system failure of the distributed computing infrastructure includes determining if a number of consecutive real-time input measurement vectors are mapped to anomalous neurons.

19. The system of claim 13, wherein the computer machine calculates a difference between a set of nearby normal neurons and the anomalous neuron, wherein the input measurement vector is mapped to generate the ranked list of top contributing metrics for the predicted anomaly.

20. The system of claim 12, wherein the computer machine generates the artificial neural network model of normal and anomalous behavior includes updating a self-organizing map ("SOM").

21. The system of claim 20, wherein updating the SOM includes
receiving an input measurement vector,
calculating a distance of the input measurement vector to a weight vector of each neuron in the SOM,
selecting a neuron in the SOM with the smallest distance to the input measurement vector,
updating the weight vector of the selected neuron, and
updating weight vectors of neurons in a neighborhood of the selected neuron.

22. The system of claim 12, wherein the at least one preventative action includes at least one selected from a group consisting of rebooting a virtual machine, restarting a virtual machine, migrating a virtual machine to another host, cloning a virtual machine, scaling a resource of a virtual machine, and disk cleanup.

* * * * *

UNITED STATES PATENT AND TRADEMARK OFFICE
CERTIFICATE OF CORRECTION

PATENT NO. : 10,311,356 B2  
APPLICATION NO. : 14/480270  
DATED : June 4, 2019  
INVENTOR(S) : Xiaohui Gu et al.

Page 1 of 1

It is certified that error appears in the above-identified patent and that said Letters Patent is hereby corrected as shown below:

In the Specification

Column 1, Line 24:
Replace the following paragraph:
[[This invention was made with government support under Contract No. 550816, awarded by the U.S. National Science Foundation, and Contract No. 552318, awarded by the U.S. Army Research Office. The government has certain rights in the invention.]]

With the paragraph:
--This invention was made with government support under grant number 0915567 awarded by the National Science Foundation and grant number W911NF-10-1-0273 awarded by the U.S. Army Research Office. The government has certain rights in the invention.--

Signed and Sealed this  
Fifth Day of December, 2023

Katherine Kelly Vidal  
*Director of the United States Patent and Trademark Office*